(12) United States Patent
Brasseur et al.

(10) Patent No.: US 7,944,216 B2
(45) Date of Patent: May 17, 2011

(54) CAPACITANCE SENSOR

(75) Inventors: Georg Brasseur, Vienna (AT); Thomas Bretterklieber, Lieboch (AT); Dirk Hammerschmidt, Villach (AT); Gert Holler, Graz (AT); Tobias Werth, Villach (AT); Hubert Zangl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 236 days.

(21) Appl. No.: 12/329,335

(22) Filed: Dec. 5, 2008

(65) Prior Publication Data
US 2009/0243633 A1 Oct. 1, 2009

(30) Foreign Application Priority Data
Dec. 6, 2007 (DE) .......................... 10 2007 058 707

(51) Int. Cl.
*G01R 27/26* (2006.01)
(52) U.S. Cl. .......................... 324/681; 324/679; 324/686
(58) Field of Classification Search .................. 324/658, 324/679, 681
See application file for complete search history.

(56) References Cited

U.S. PATENT DOCUMENTS

| | | | |
|---|---|---|---|
| 4,878,013 A | 10/1989 | Andermo | |
| 4,977,786 A | 12/1990 | Davis | |
| 6,225,710 B1 | 5/2001 | Palata et al. | |
| 6,300,776 B1 | 10/2001 | Schreiber et al. | |
| 7,451,050 B2 * | 11/2008 | Hargreaves | 702/69 |
| 2008/0186034 A1 * | 8/2008 | Scheckenbach et al. | 324/679 |

FOREIGN PATENT DOCUMENTS

| CA | 2 255 321 C | 6/1999 |
|---|---|---|
| DE | 198 13 013 A1 | 9/1999 |

* cited by examiner

*Primary Examiner* — Vincent Q Nguyen
(74) *Attorney, Agent, or Firm* — Slater & Matsil, L.L.P.

(57) ABSTRACT

A capacitance sensor, having at least one electrode is disclosed. A frequency spread signal generation circuit is coupled to the at least one electrode to apply a frequency spread signal based on a spread sequence. A periodic signal with a frequency is coupled to the at least one electrode. A frequency controller is coupled to the frequency spread signal generation circuit to vary the frequency of the periodic signal. A receiver circuit is coupled to the at least one or a further electrode to receive a version of the frequency spread signal which depends on a capacitance applied to the at least one electrode. An evaluation circuit is coupled to the receiver circuit to determine a capacitance value based on the received, dependent version of the frequency spread signal.

23 Claims, 10 Drawing Sheets

CAPACITANCE SENSOR

This application claims priority to German Patent Application 10 2007 058 707.6, which was filed Dec. 6, 2007 and is incorporated herein by reference.

TECHNICAL FIELD

The present invention relates to capacitive sensors and to methods for the detection of a capacitance or a capacitance change, respectively.

BACKGROUND

Capacitive sensors or capacitance sensors, respectively, for example, serve for detecting the presence of persons or objects in a room or spatial area to be monitored. Capacitance sensors generate electric fields between two or more electrodes. What is measured is a change of an electric field by the change of a capacitive coupling between the electrodes when introducing an object, when changing a composition of a body in the field or when changing an electric coupling to a surrounding mass potential.

Further examples of the application of capacitance sensors are, for example, tank level meters, quality surveillance sensors, inclination angle sensors, flow rate sensors based on tomography principles, sensors for clamping protection, interior and exterior surveillance or touchpads for actuators.

The measurement accuracies that may be achieved by capacitive sensors or the possible detection ranges substantially depend on a signal-to-noise ratio of the electric field measurement. On the one hand, a noise of a transmitter and a noise of a receiver contribute to the noise component of detected signals. This noise may be well controlled by measures in circuit design. On the other hand, however, environmental noise also occurs, which originates from other electric or electromagnetic field sources, respectively, in the surroundings. In order to be able to guarantee high signal-to-noise ratios especially in high interference environments, like, e.g., cars, there is thus a need to increase the electric or electromagnetic field strength, respectively, of a capacitive sensor system as far as possible without exceeding certain limits for electromagnetic radiation. Further, interferences from strong couplings or launchings of external signal sources are to be avoided as best as possible.

SUMMARY OF THE INVENTION

According to embodiments, the present invention provides a capacitance sensor comprising at least one electrode, a frequency spread signal generation circuit coupled to the at least one electrode to apply a frequency spread signal based on a spread sequence and a periodic signal with a frequency to the at least one electrode, a frequency controller coupled to the frequency spread signal generation circuit to vary the frequency of the periodic signal, a receiver circuit coupled to the at least one or a further electrode to receive a version of the frequency spread signal which depends on a capacitance applied to the at least one electrode, and an evaluation circuit coupled to the receiver circuit to determine a capacitance value based on the received, dependent version of the frequency spread signal.

Further, the present invention provides a method for detecting a capacitance or a capacitance change, comprising applying a frequency spread signal to the at least one electrode, wherein the frequency spread signal is based on a spread sequence and a periodic signal with a frequency, varying the frequency of the periodic signal, receiving a version of the frequency spread signal which depends on a capacitance applied to the at least one electrode, and determining the capacitance or a value which may be derived from the same from the received, dependent version of the frequency spread signal.

BRIEF DESCRIPTION OF THE DRAWINGS

In the following, embodiments of the present invention are explained in more detail with reference to the accompanying drawings, in which.

DETAILED DESCRIPTION OF ILLUSTRATIVE EMBODIMENTS

With reference to the following description it should be noted, that in different embodiments, the same or like functional elements comprise the same reference numerals and that the description of the functional elements may be applied to the embodiments of different figures.

In the following, the term "signal" is used for currents or voltages likewise, unless explicitly indicated otherwise.

Figure 1:
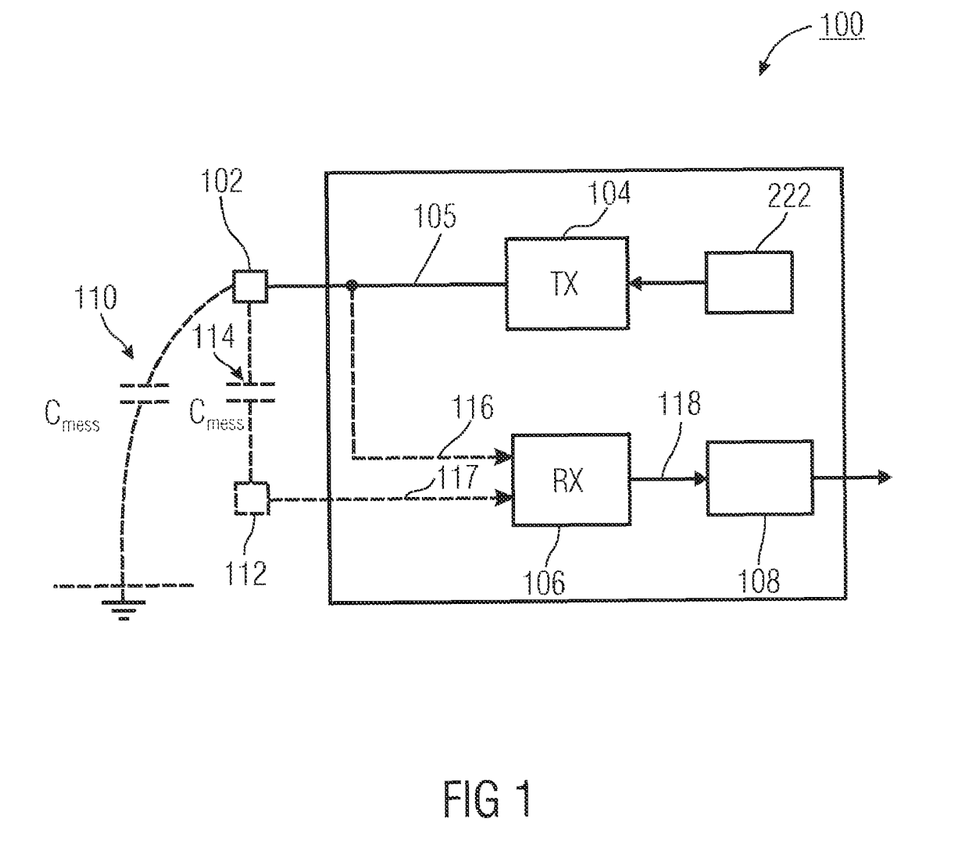
FIG. 1 shows a schematic block diagram of a capacitive sensor according to one embodiment of the present invention.

FIG. 1 shows a block diagram of a capacitive sensor 100 according to one embodiment of the present invention.

The capacitive sensor 100 comprises at least one electrode 102. The at least one electrode 102 with a means 104 for applying a frequency spread signal 105 based on a binary spread sequence and a periodic signal having a signal frequency $f_c$ is connected to the at least one electrode 102. The signal frequency $f_c$ of the periodic signal may be varied using a means 222. Further, the capacitive sensor 100 comprises a means 106 for receiving the frequency spread signal, wherein the received frequency spread signal is affected by a capacitance value $C_{mess}$ to be determined. The means or receiver circuit 106, respectively, is connected to a means 108 for determining the capacitance value $C_{mess}$ or a value derived from the same based on the received frequency spread signal.

Figure 10:
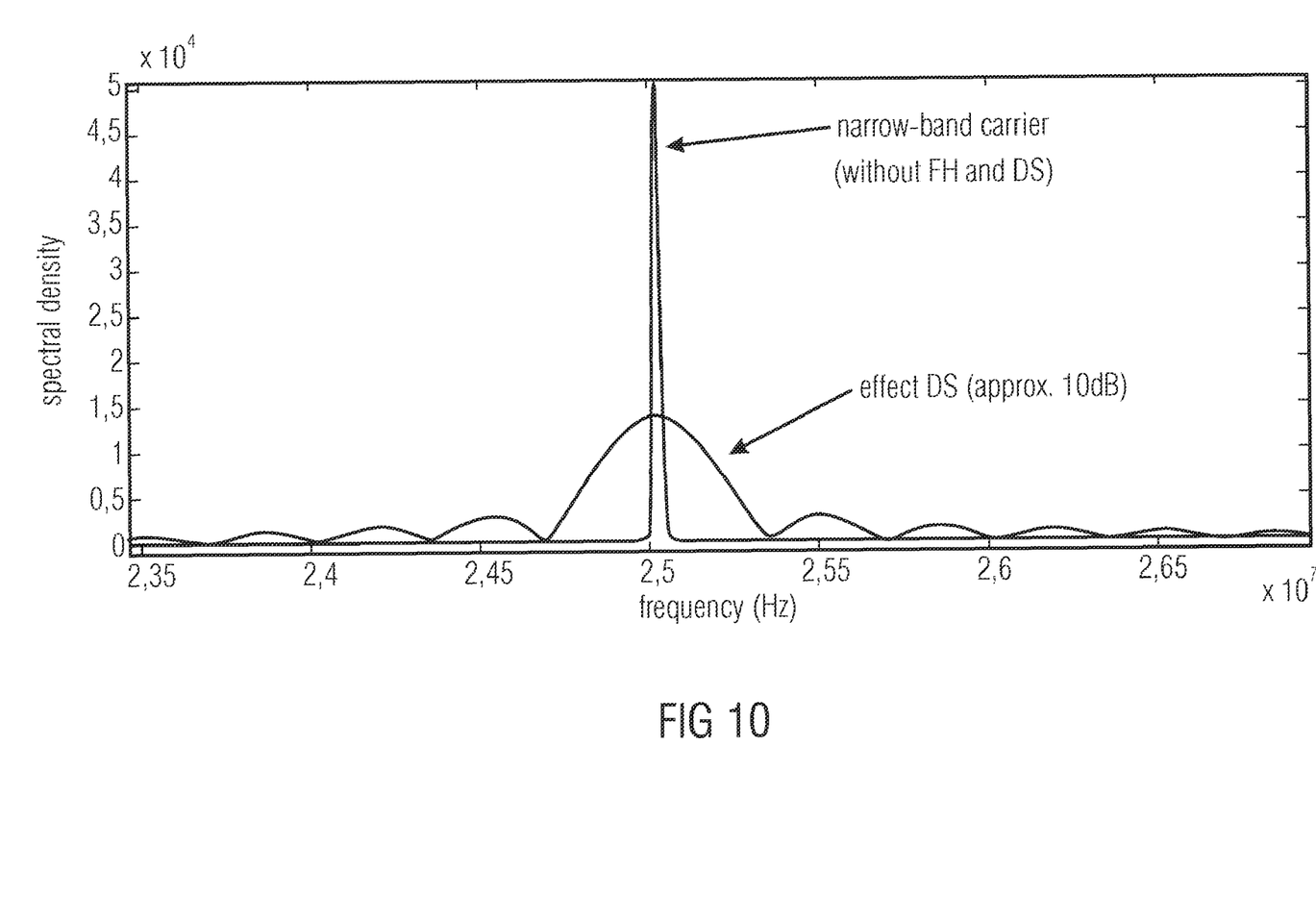
FIG. 10 shows an illustration of an effect of a frequency spreading to a carrier signal according to an embodiment of the present invention.

The frequency spread signal 105 applied by the means or the frequency spread signal generation circuit 104, respectively, to the at least one electrode 102, may be a spread code or a spread sequence, respectively, clocked by the periodic signal, or a periodic carrier signal modulated using a spread code. Here, a spread code may be a spread code used in a band spreading method, like, e.g., DSSS (DSSS=direct sequence spread spectrum), using messages to be transmitted for wireless data transmission are spread. A spread code is a so-called pseudo-noise sequence, which may also be referred to as a PN sequence. In contrast to wireless data transmission systems, with the capacitive sensor of FIG. 1 no useful signals or information signals, respectively, are spread. Rather, a signal applied to the at least one electrode 102 is spectrally spread by a spread code, as it is exemplarily shown in FIG. 10. Here, the signal may be a periodic alternating signal or a direct signal, e.g., in the form of a voltage or a current.

The capacitance sensor may only comprise one electrode 102 which simultaneously acts as a transmit and receive electrode, as it is illustrated in FIG. 1. In this case, a capacitance $C_{mess}$ to be measured may be located between the electrode 102 and a reference potential, which may, for example, be a mass potential, as indicated in FIG. 1 by reference numeral 110. According to alternative embodiments, a capacitive sensor may also comprise a plurality of electrodes to be able to balance out interferences, wherein all the electrodes may, for example, respectively operate simultaneously as transmit and receive electrodes. In such embodiments, several coupling capacities $C_{mess}$ may be measured according to the number of electrodes. The plurality of electrodes of a capacitive sensor may again, according to alternative embodiments, also be divided into one or several separate transmit electrodes on the one hand and one or several separate receive electrodes on the other hand, which is discussed in more detail in the following.

If a capacitive sensor 100, in addition to the at least one electrode 102, comprises at least one further electrode 112 which serves as a receive electrode, then the capacitance $C_{mess}$ to be measured is located between the at least one electrode 102 (transmit electrode) and the at least one further electrode 112 (receive electrode), as indicated in FIG. 1 by the reference numeral 114.

A signal 116 or 117 detected by the at least one electrode 102 or the at least one further electrode 112 is supplied to the means 106 for receiving the frequency spread signal. The receive signal 116 or 117, respectively, is a signal depending on the capacitance $C_{mess}$ and the frequency spread signal 105, like, e.g., a displacement current. The frequency spread signal 105 generated by the capacitive sensor device 100 again generates an electric field influencing an object to be examined or to be detected between the electrodes, wherein the field is changed by the object to be detected. The object to be detected influences the electric field between the electrodes of the capacitive sensor device and thus changes the capacitance $C_{mess}$ of the measurement capacitor, so that, for example, via the determination of the displacement current of the measurement capacitor, or by the determination of a measurement variable correlating with this displacement current, respectively, a capacitance change may be determined based on the object to be detected. The relevant electric characteristics of the object to be detected include its dielectric constant, its conductivity and its coupling to the surrounding mass potential.

The means 106 for receiving filters the detected signal 116 or 117, respectively, by calculating a correlation between the spread code of the means 104 for applying known to the same and the detected signal 116 or 117, respectively. The detected signal 116 or 117, respectively, includes the frequency spread signal 105 and additional noise. The correlation provides a correlation value signal 118 which is generally complex valued and depends on the capacitance $C_{mess}$ and the frequency spread signal 105 and which may, according to embodiments, be a signal proportional to the capacitance $C_{mess}$.

The complex correlation value signal 118 is supplied to the means or evaluation circuit 108, respectively, for determining the capacitance value $C_{mess}$ in order to determine the capacitance value $C_{mess}$. According to embodiments, the evaluation circuit 108 may further be implemented to determine a signal which may be derived from the capacitance value $C_{mess}$.

The use of spread codes in connection with a capacitive measurement enables a theoretically arbitrary expansion or spreading, respectively, of a signal spectrum applied to the at least one electrode 102 by lengthening the spread code (in the extreme case an infinitely long random sequence with a white spectrum). A lengthening of the spread code or the spread sequence, respectively, leads to a lengthening of a capacitance measurement time period, however. This may limit the possibility of multiplexing between several transmit and/or receive electrodes, for example, according to a TDMA method (TDMA=time division multiple access), which may, in particular, be disadvantageous when the measurement of different electrodes should at least be virtually simultaneous as, for example, they are to enable conclusions about a current seat occupation state.

It may further be the case that reference measurements for the determination and evaluation and/or subtraction of noise energy become less and less relevant, as a correlation between the measurement value and the reference measurement decreases with an increasing time distance between both measurements.

Thus, according to one embodiment, for the spectral spreading of the periodic carrier signal, only relatively short spread codes are used having a short period length $T_P$ or a relatively high ratio between the symbol duration $T_S$ of a spread symbol on the one hand and the period duration $T_P$ on the other hand, respectively. In embodiments, for example, $T_S/T_{P\cong}1/16$ applies.

An additional spectral spreading is achieved in embodiments by a variation of the signal frequency $f_c$ by the means 222 according to a frequency hopping method. By the frequency hopping method, for example, the signal frequency $f_c$ may be varied in a range between about 20 MHz and about 30 MHz. For successive capacitance measurements between a transmit and a receive electrode 102, 112, the signal frequency $f_c$ may, for example, be changed after a period of the spread code elapses, so that respective successive measurement cycles comprise different carrier frequencies $f_c$.

Figure 2:
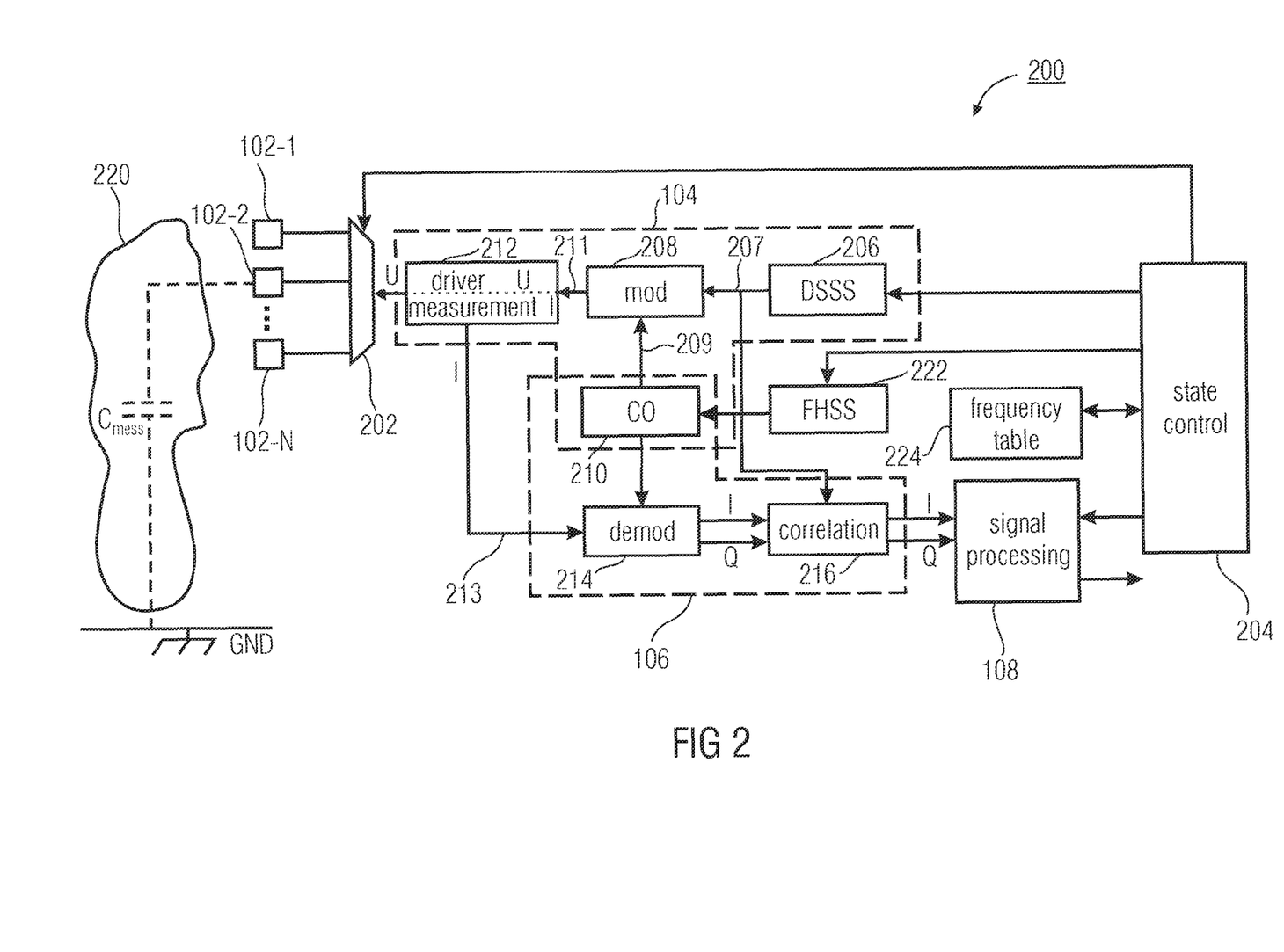
FIG. 2 shows a block diagram of a capacitive sensor according to a further embodiment of the present invention.

FIG. 2 shows a block diagram of a capacitive sensor 200 according to a further embodiment. The capacitive sensor 200 comprises a plurality of electrodes 102-$n$ (n=1, ..., N). The plurality of electrodes 102-$n$ (n=1, ..., N) is coupled to a means 104 for applying a frequency spread signal 105 to the electrodes 102-$n$ (n=1, ..., N) via a multiplexer 202. The electrodes 102-$n$ (n=1, ..., N) act, in this embodiment, both as transmit and receive electrodes. The multiplexer 202 is controlled by a sequence control circuit 204. The means 104 for applying the frequency spread signal 105 comprises a means 206 for providing a spread code 207. Further, the means 104 includes a modulation means 208 to modulate a periodic alternating signal or oscillation signal 209, respectively, from a (programmable) controllable oscillator 210 with the spread code 207. The modulation may here, for example, be an amplitude modulation which may also correspond to a phase modulation with a binary spread code 207. In this case, with one of the two possible binary symbols the phase of the periodic oscillation signal 209 is shifted by 180°, which corresponds to an amplitude inversion. The resulting modulated signal 211 is fed to a driver means 212 which provides the frequency spread signal 105 at its output, for example, in the form of a voltage U modulated using the spread code 207 for the electrodes 102-$n$ ($n=1, \ldots, N$).

Typically, transmitting is performed by driving the electrodes 102-$n$ ($n=1, \ldots, N$) with the modulated alternating voltage U. In the embodiment illustrated in FIG. 2, receiving is done by measuring a displacement current at the respective electrodes 102-$n$ ($n=1, \ldots, N$) according to $I_n = U \cdot j\omega C_{mess,n}$ ($n=1, \ldots, N$), wherein $\omega$ indicates the angular frequency of the periodic alternating signal 209 and $C_{mess,n}$ indicates the capacitance between the $n^{th}$ electrode 102-$n$ and mass potential. In this respect, in this embodiment, the driver means 212 additionally includes a current measurement means for signal reception at the electrodes 102-$n$ ($n=1, \ldots, N$). A receive signal 116 measured in the means 212 in this way, e.g., in the form of a current $I_n$, is supplied to a demodulator 214 which mixes the receive signal 116 with the periodic oscillating signal 209 of the controllable oscillator 210. At the output of the demodulator 214 thereupon a complex base band signal with an in-phase (I) and a quadrature component (Q) is applied which is supplied to a correlator or a correlation receiver 216, respectively. The correlation receiver 216 then correlates the spread code 207 with the demodulated, complex receive signal. This correlation may take place for any electrode 102-$n$ ($n=1, \ldots, N$) each by an integration of the complex receive signal multiplied with the spread code 207 over the period duration $T_P$ of the spread code 207. An energy of a noise or narrow band interference signal overlaid onto the transmitted modulated carrier signal may be reduced by the correlation receiver 216, as the interference signal is not synchronous to the spread code 207. Magnitude and phase of the correlation value resulting for each electrode 102-$n$ ($n=1, \ldots, N$) at the output of the correlation receiver 216 depend on the measurement capacitance $C_{mess}$. The respective complex correlation values at the output of the correlation receiver 216 are supplied to the means 108 for determining the capacitance value $C_{mess}$ or for determining a signal that may be derived from the capacitance value $C_{mess}$.

The electrodes 102-$n$ may be selected within a measurement cycle by the multiplexer 202 or the sequence control circuit 204, respectively, according to a TDMA method. Here, a measurement cycle is determined by a time period, during which the carrier frequency $f_c$ of the periodic carrier signal 209 is not changed. According to one embodiment, in a measurement cycle the electrodes 102-$n$ are, for example, controlled one after the other by the multiplexer 202 or the sequence control circuit 204, respectively, for the duration or time period $T_P$ of a period of the spread code 207 so that one complex correlation value may be determined one after the other for each electrode 102-$n$. Here, within a measurement cycle, the carrier frequency $f_c$ is the same for all the electrodes 102-$n$. Advantageously, the carrier signal 209 is also modulated for each electrode 102-$n$ with the same spread code 207 each time, so that the respective capacitance measurements take place during a measurement cycle in the same frequency band. However, different spread sequences 207 are possible each time.

As soon as capacitance measurements have been performed for all the electrodes 102-$n$ within one measurement cycle in the above-described way, the carrier frequency $f_c$ of the carrier signal 209 is changed for the subsequent measurement cycle by the FHSS control 222 (FHSS=frequency hopping spread spectrum), coupled both to the sequence control circuit 204 and also to the controllable oscillator 210. In this respect, the sequence control circuit 204 is again coupled to a frequency table 224. The frequency $f_c$ of the oscillator 210 may, for example, be set by predetermining a digital value. The frequency $f_c$ may, for example, be in a range from about 20 to about 30 MHz and may be set to intervals of steps of about 100 KHz between these boundary frequencies.

In embodiments, the frequency control 222 is thus implemented to change the frequency $f_c$ after an integer multiple of the period length $T_P$, wherein the integer multiple of the period length $T_P$ is determined by the number of transmit electrodes.

As already described, the means for receiving includes a receiver in the form of a current measurement means tapping a signal 116, which depends on the frequency spread signal 105 and the respective measurement capacitance $C_{mess}$, in the form of a current $I_n = U \cdot j\omega C_{mess,n}$ ($n=1, \ldots, N$) from the electrodes 102-$n$. This signal 116, which depends on the frequency spread signal 105 and the measurement capacitance $C_{mess}$ may be further processed by the demodulator 214. It demodulates the signal 116, e.g., synchronous to the used carrier frequency of the carrier signal 209. In the correlation receiver 216 the cross-correlation of the demodulated signal with the transmitted spread code 207 is then determined. The magnitude of the correlation value is a measure for the energy of the received signal 116 which is derived from the transmitted frequency spread signal 105. The energy of an overlaid noise or a narrow-band interference signal is reduced as compared to a useful signal to be detected, like, e.g., a voltage or a current, as the interference is not synchronous to the spread code 207.

By the demodulator 214, for example, an I/Q demodulation is performed to be able to determine, apart from the magnitude of the coupling between the transmit signal or frequency spread signal 105, respectively, and the receive signal 116, a phase shift between the transmit and the receive signal as well. An I/Q demodulation may, for example, be performed by means of two mixers, i.e., a first mixer for the I component to which for this purpose the periodic carrier signal 209 is supplied without a phase shift, and a second mixer for the Q component to which for this purpose the periodic carrier signal 209 is supplied with a relative phase shift of 90°, which may, for example, be generated by a phase shifter. The two mixers may have downstream low-passes for the selection of the I and Q components.

The FHSS or frequency control 222, respectively, may change the carrier frequency $f_c$ either after a capacitance measurement with one of the electrodes 102-$n$, i.e., after the elapse of a period of a spread code, which leads to a best possible spreading of the frequency spectrum, or after each measurement cycle, in which case all electrodes 102-$n$ ($n=1, \ldots, N$) are controlled according to a time multiplex method each for the duration $T_P$ of a spread code period. A change of the carrier frequency $f_c$ is, for example, advantageous if it has to be assumed that the performance of the capacitive coupling mechanism is frequency-dependent or that the interference reaction in the channel, i.e., the measurement object 220, varies with different frequencies.

In temporal proximity of an actual measurement, like, e.g., before the start of the measurement with a frequency spread signal 105, a reference measurement may take place in which none of the electrodes 102-$n$ is modulated, i.e., transmits. By this, a noise level prevailing at an electrode 102-$n$ selected by the multiplexer/demultiplexer 202 may be used as an indication for the smallest detectable signal power or signal change, respectively. When the result of the reference measurement exceeds a tolerable noise level, the sequence control circuit 204 may, e.g., decide to skip measurements in the affected carrier frequency $f_c$ of the alternating signal 209 and to instruct the FHSS control 222 to change the carrier frequency or measurement frequency $f_c$, respectively. Highly interfered frequencies may, for example, be stored in a list and be skipped immediately in the next decisions to be taken within a predetermined time period, so that the capacitive sensor 200 automatically optimally adapts to environmental conditions. Additionally or alternatively, via the spread code generator 206 and the sequence control circuit 204 a length or period duration $T_P$, respectively, of the spread code 207 may be increased in order to decrease a noise level.

According to embodiments, the correlation receiver 216 includes an integrator which integrates a certain number of measurement values to further increase a signal-to-noise ratio. This integration may take place by a direct repetition of measurements with the same or with a changed frequency $f_c$.

Alternatively, also for each electrode 102-$n$ (n=1, ..., N) a distinct integrator may be used and the assignment of the measurement values to the integrators may be performed synchronously to the multiplexer control via several multiplex cycles. This means, that the multiplexer 202 also selects respective integrators associated with the electrodes 102-$n$ (n=1, ..., N). This interleaved measurement may have the advantage that, by an expert control of the multiplexer 202, it may be achieved that the average age of the measurement values (a DSSS sequence) introduced into the integration is equal or only slightly different. In contrast, with a continuous integration of the measurement values of all electrodes, the values for temporally successive electrodes are apart from each other by one integration period (DSSS sequence) each, which may lead to substantial inaccuracies for a measurement of fast changes, as it is, for example, needed for the capacitance tomography for flow rate determination. The described interleaved measurement necessitates a higher hardware complexity.

In further embodiments, integrators may also be completely omitted. This is, for example, possible when a measurement cycle with a constant carrier frequency $f_c$ includes a time multiplex of the electrodes 102-$n$ with a spread code symbol rate 1/$T_S$. In such a scenario, for example, a replica of a spread sequence 207 phase-shifted to each other that modulates a carrier signal 209 with the frequency $f_c$ are supplied to all the electrodes 102-$n$, wherein the electrodes 102-$n$ are connected through in the spread code symbol rate 1/$T_S$ and for each electrode 102-$n$ at least one correlation value 118 is determined within a spread code symbol duration $T_S$. That is, depending on the embodiment, within a spread code symbol duration $T_S$ at least one correlation value 118 is determined according to a capacitance between a currently controlled electrode 102-$n$ (n=1, 2, ..., N) and a further electrode 112 (receive electrode) or according to a capacitance between the currently controlled electrode 102-$n$ (n=1, 2, ..., N) and mass. With more than one correlation value for each controlled electrode 102-$n$ within a spread code symbol duration $T_S$ a rate in which the sampled correlation values are determined is higher than 1/$T_S$. The frequency control 222 may thus, for example, be implemented to change the frequency $f_c$ after an integer multiple of the symbol duration $T_S$, wherein the integer multiple of the symbol duration $T_S$ may be determined by the number of transmit electrodes. Embodiments without a frequency variation or frequency hopping, respectively, after a measurement cycle, i.e., after a sequential control of all the electrodes 102-$n$ (n=1, 2, ..., N), are also possible, of course. By the frequency hopping, however, an even higher spectral spreading may be achieved.

Figure 7:
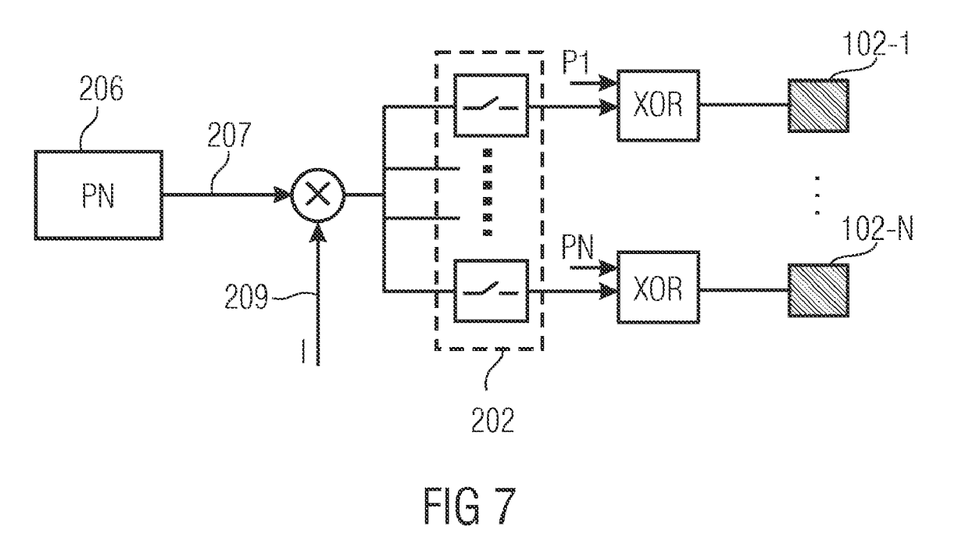
FIG. 7 shows a block diagram of a frequency spread signal generation circuit according to one embodiment of the present invention.

In this respect FIG. 7 exemplarily shows a formation of the modulation of the periodic carrier signal 209 with the pseudo-random sequence 207 and the distribution of the transmit signal by means of switches in the multiplexer 202 onto the transmit electrodes 102-$n$ according to one embodiment. A phase position of the individual transmit signals may here be determined via the signals P1 to PN.

A respective phase information of the carrier signal 209, which belongs to a considered electrode 102-$n$ and is determined by a currently applied symbol of the spread sequence 207, may be provided to the I/Q demodulator 214 with the spread code symbol rate 1/$T_S$. Based on the phase information or the current spread code symbol, respectively, for this purpose the periodic carrier signal 209 is supplied to a first mixer for the I component with a 0° or 180° phase shift, while the periodic carrier signal 209 is supplied to a second mixer for the Q component with a relative phase shift of 90°, i.e. 90° or 270° absolute.

Figure 8:
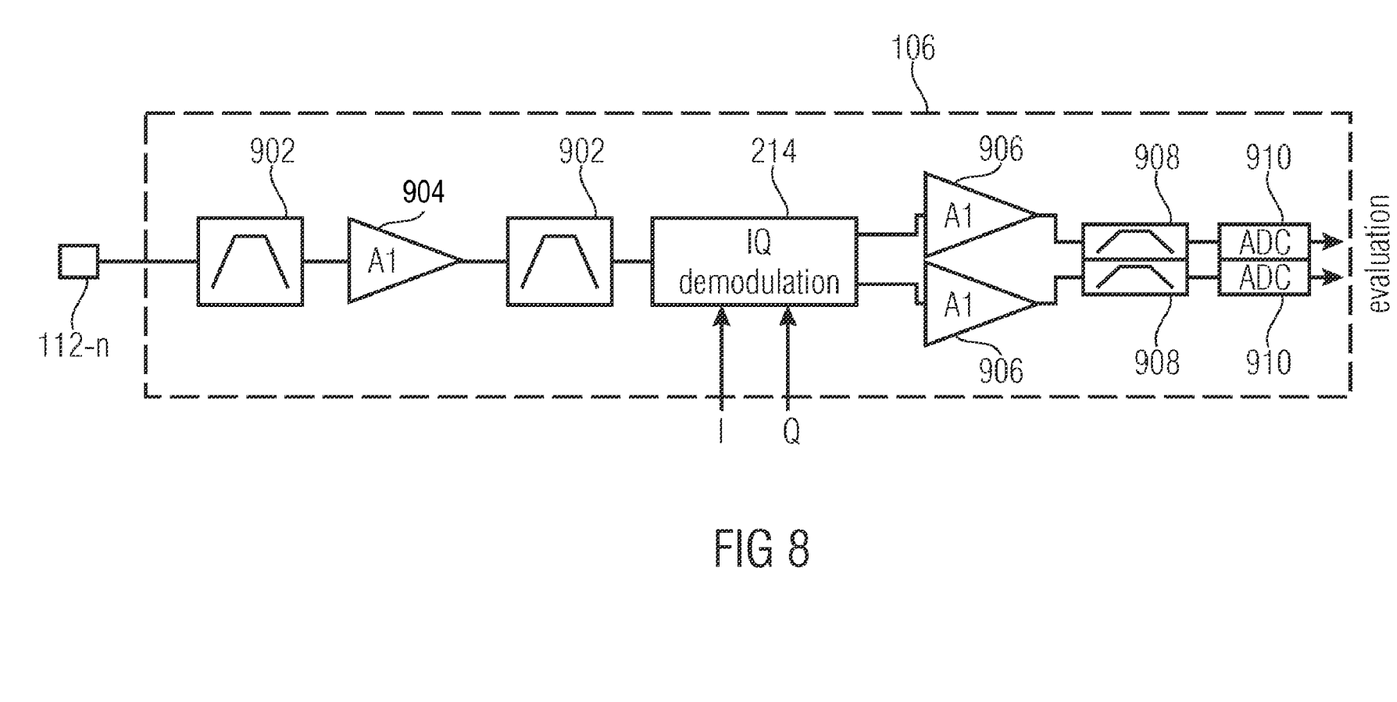
FIG. 8 shows a block diagram of a receiver circuit according to an embodiment of the present invention.

One example of a receiver circuit without an integrator is illustrated in FIG. 8.

Before the IQ demodulator 214, the receive signal 116, 117 is filtered and amplified by means of a band pass filter 902, an amplifier 904 and a band pass filter 902 downstream to the amplifier. Before the I and Q components of the demodulated receive signal are respectively converted analog to digital by an analog-to-digital converter 910 (ADC), they are each amplified and filtered by means of an amplifier 906 and a band pass filter to suppress possible interference signal portions. The I/Q components converted analog to digital may then be passed to the evaluation means 108 for further signal processing.

Figure 3:
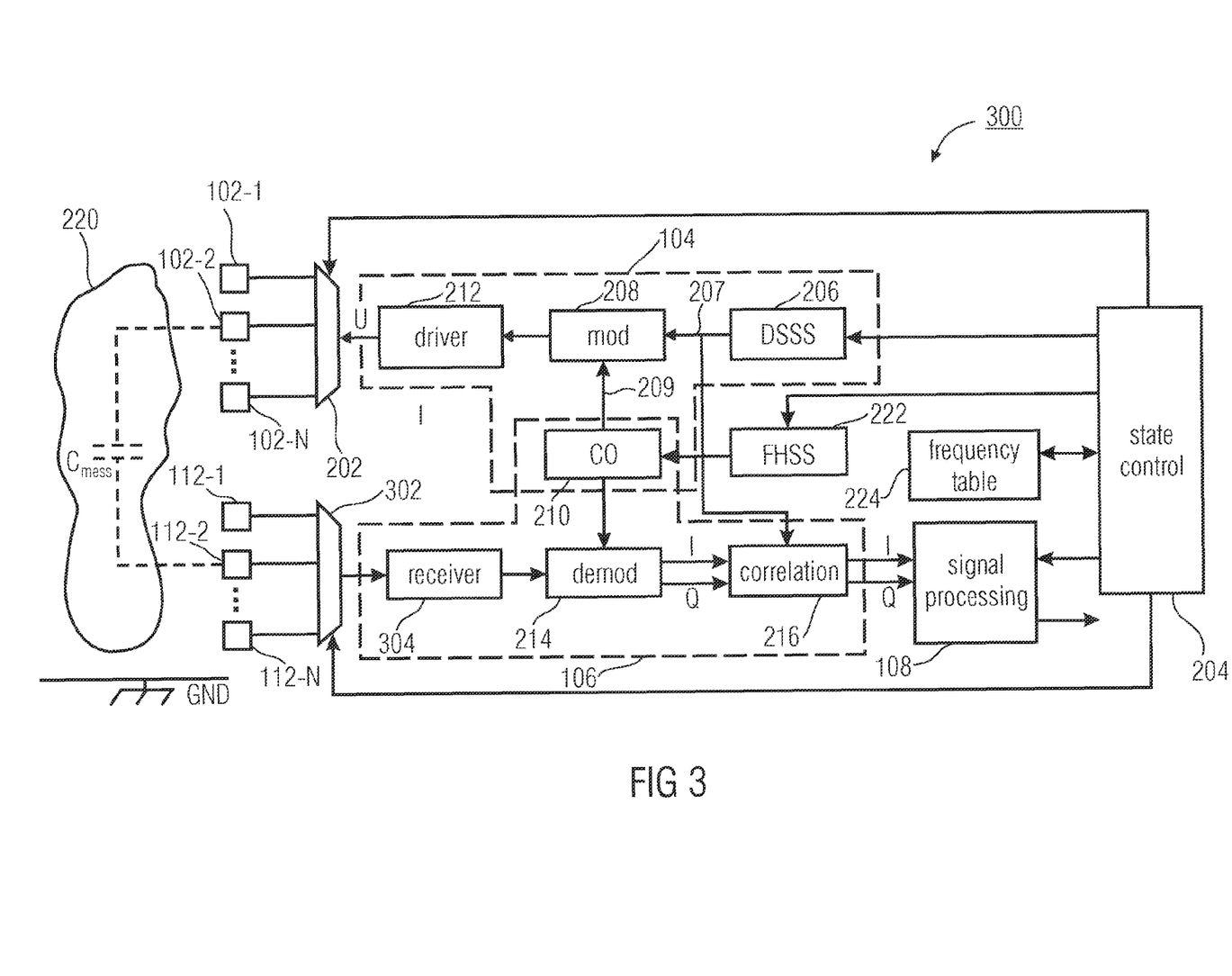
FIG. 3 shows a block diagram of a capacitive sensor according to a still further embodiment of the present invention.

After embodiments of the present invention have been discussed above, in which the electrodes 102-$n$ (n=1, ..., N) serve both as transmit and also receive electrodes, with reference to FIG. 3 an embodiment of the present invention is to be described, wherein both a separate set of transmit electrodes and also a separate set of receive electrodes are used.

The capacitive sensor illustrated in FIG. 3 comprises N transmit electrodes 102-$n$ (n=1, ..., N) and M receive electrodes 112-$m$ (m=1, ..., M). The transmit electrodes 102-$n$ (n=1, ..., N) are controlled by the driver 212 and the modulator 208. The frequency spread signal 105 is supplied to the transmit electrodes 102-$n$ (n=1, ..., N) via the multiplexer 202 which is controlled by the sequence control circuit 204.

The receive electrodes 112-$m$ (m=1, ..., M) are coupled to a multiplexer 302 which passes on the corresponding receive signals 117 to a receiver 304 which is coupled to the demodulator 214 on the output side. The multiplexer 302 is controlled by the sequence control circuit 204 just like the multiplexer 202. The functioning of the remaining blocks illustrated in FIG. 3 corresponds to the respective functioning, as it was already described with reference to FIG. 2.

Due to the dielectric characteristics of the object 220 to be measured between the two electrodes, a capacitance $C_{mess}$ forms between a controlled transmit electrode 102-$n$ (n=1, ..., N) and a controlled receive electrode 112-$m$ (m=1, ..., M), as it is exemplarily indicated in FIG. 3.

The FHSS control 222 may be implemented, for example, to vary the frequency $f_c$ of the controllable oscillator 210 according to the frequency table 224 after each capacitance measurement, which leads to a high spreading of the frequency spectrum. Here, a capacitance measurement is, for example, a measurement from the $n^{th}$ (n=1, ..., N) transmit electrode to the $m^{th}$ (m=1, ..., M) receive electrode with the duration $T_P$ of a spread sequence 207.

According to further embodiments, the FHSS control 222 may change the carrier frequency $f_c$ also after each measurement sequence, wherein a measurement sequence is, for example, the combination of all N transmit electrodes with one receive electrode each for the duration $T_P$ of a spread sequence 207 or all M receive electrodes with only one transmit electrode for the duration $T_P$ of a spread sequence 207 or, again, all permutations between transmit and receive electrodes.

A change of the carrier frequency $f_c$ may be advantageous if it has to be assumed that the performance of the capacitive coupling mechanism is frequency-dependent across the measurement object 220 or that the interference performance or behavior, respectively, in the measurement object 220 or in the channel, respectively, varies with different frequencies.

In further embodiments, integrators may also be completely omitted. This is possible, for example, when, in time division multiplexing, for example, a replica of a spread sequence 207 phase-shifted to each other that modulates a carrier signal 209 with the frequency $f_c$ are supplied to all electrodes 102-$n$, wherein the electrodes 102-$n$ are connected through in a spread code symbol rate $1/T_S$ and for each electrode 102-$n$ at least one correlation value 118 is determined within a spread code symbol duration $T_s$. In this way, the carrier signal 209 comprises a frequency spreading by the modulation for an external observer.

Figure 9:
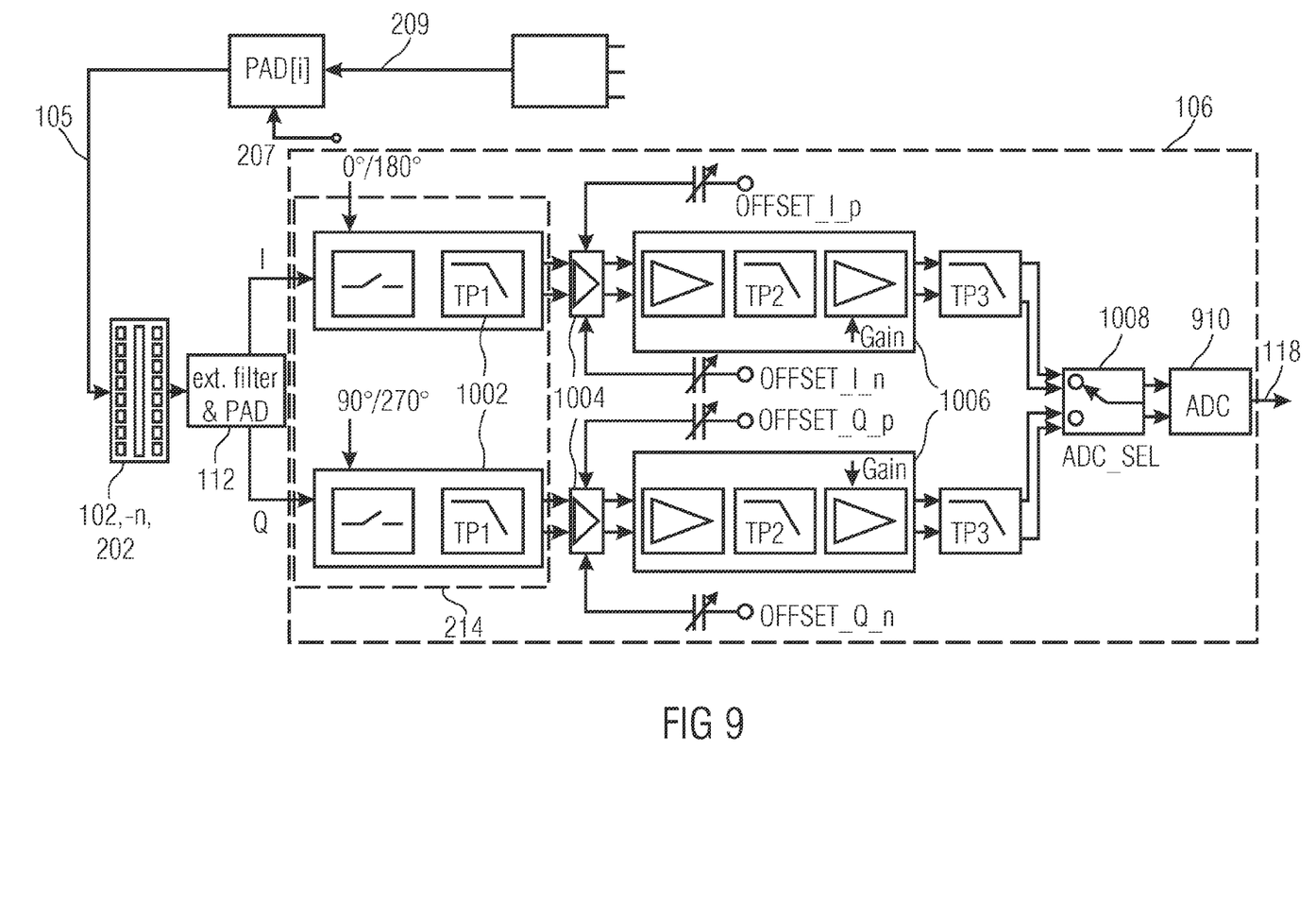
FIG. 9 shows a block diagram of a capacitive sensor according to a further embodiment of the present invention.

In this respect, FIG. 9 only exemplarily shows a schematic of an overall system of a capacitance sensor having a receive means 106 and a realization with only one analog-to-digital converter 910 which is divided between the I and Q paths.

After the periodic signal 209 has been modulated with the binary random signal 207 and given onto one of the transmit electrodes 102-$n$ by means of the multiplexer 202, a signal proportional to the corresponding capacitance value $C_{mess,n}$ may be received at the receive electrode 112. The receive signal is given into an I/Q demodulator. The I/Q demodulator 214 is coupled to the binary random signal 207 to demodulate the receive signal in phase according to a phase of the periodic transmit signal 105. After the resulting I/Q components have been filtered by means of low pass filters 1002, offset capacitance values and offset conductances are compensated by means of the blocks 1004. After that, the offset-compensated I/Q values are each amplified by means of a programmable amplifier 1006 and subsequently low-pass filtered. Using a switch 1008 a selection may be performed between the I and the Q component to supply the I and Q components alternatingly each to the ADC 910 to obtain I and Q components of correlation values 118 at its output.

Offset capacitance values and offset conductances result, for example, from a predetermined environment of the electrodes 102, 112 of the capacitance sensor. By measurement objects introduced into the predetermined environment of the electrodes 102, 112, these offset values are generally changed. By the described offset compensation, a predefined value range of the ADC 910 may be utilized to the full extent.

In the embodiment illustrated in FIG. 9, the periodic carrier signal 209 is amplitude modulated (phase inversion) with a spread sequence 207 which corresponds to a binary random number, wherein a capacitance measurement rate with regard to the single capacities, determined by the sample rate of the ADC 910, from a transmit electrode 102-$n$ to the receive electrode 112 is an integer multiple of the duration $T_S$ of a spread code symbol. This means, that for a single measurement of a coupling capacitance $C_{mess,n}$ no modulation is present and that the coupling capacitance $C_{mess,n}$ may be measured directly without requiring an integration of the receive signal 117 over a period duration or length $T_P$, respectively, of a spread code.

A requested capacitance measurement rate may be achieved by a suitable selection of a carrier frequency $f_c$ which is high with respect to the capacitance measurement rate. By this, receive signals 117 with a higher signal-to-noise ratio are available, as the capacitive coupling to the used carrier frequency $f_c$ increases. Further, used filters settle with a duration which is inversely proportional to the carrier frequency $f_c$, as the bandwidth of filters may be increased accordingly.

In FIG. 9 it may further be seen that in embodiments a differential routing may be used. By a differential signal routing, electromagnetic radiations of capacitance sensors may be further reduced according to embodiments of the present invention.

The embodiments described above only enable one measurement each from a transmit electrode 102-$n$ to a receive electrode 112-$m$ at a certain point in time. In the embodiment illustrated in FIG. 4, however, for example, also a capacitance measurement is possible with several electrodes at the same time.

Figure 4:
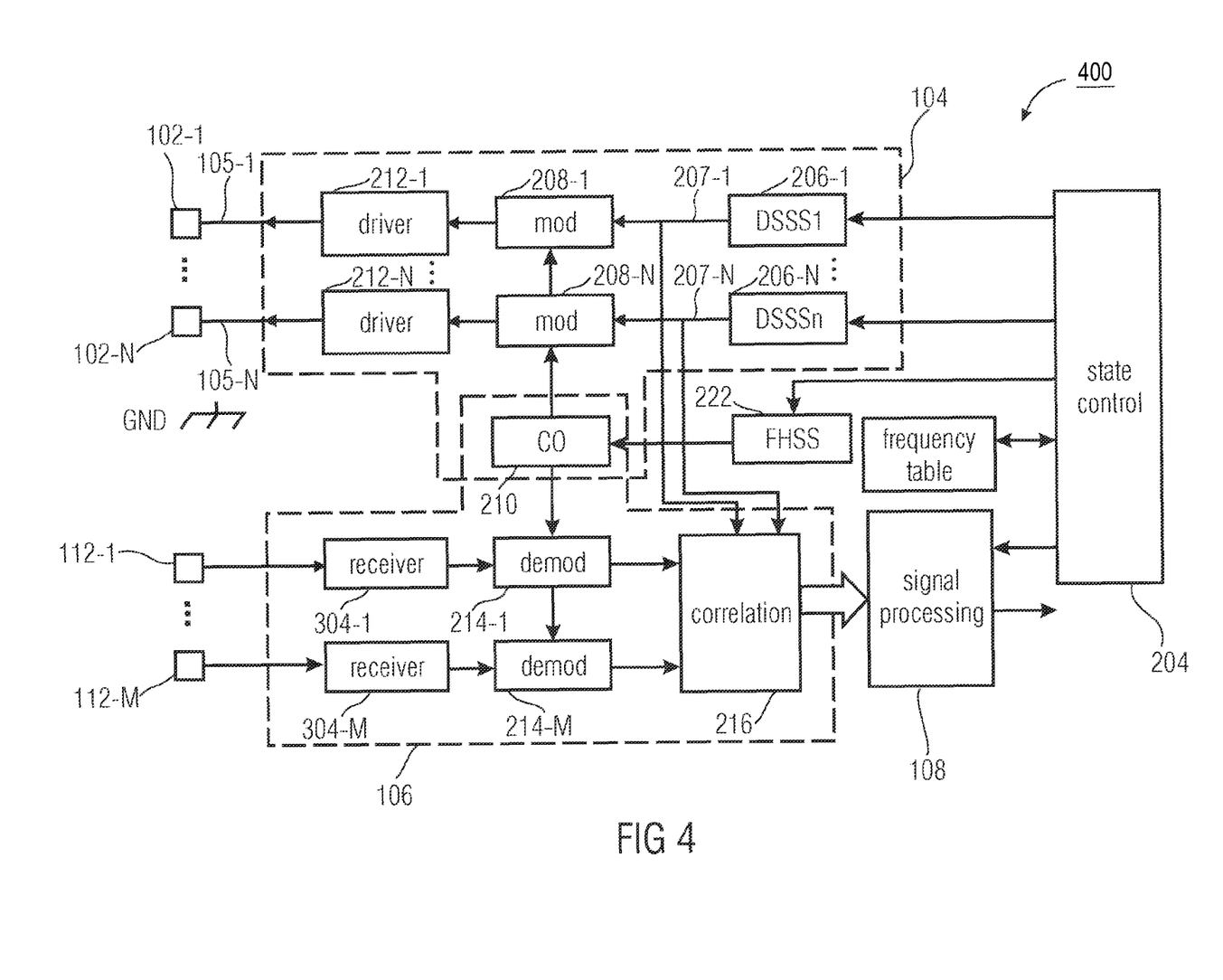
FIG. 4 shows a block diagram of a further embodiment according to the present invention.

The capacitive sensor 400 illustrated in FIG. 4 comprises a separate transmit branch consisting of a driver 212-$n$ (n=1, ..., N), a modulator 208-$n$ (n=1, ..., N) and a spread code generator 206-$n$ (n=1, ..., N) for each transmit electrode 102-$n$ (n=1, ..., N). The N spread code generators 206-$n$ (n=1, ..., N) advantageously generate spread codes 207-$n$ (n=1, ..., N) which are orthogonal to each other. One possibility to generate spread codes or PN sequences, respectively, are linearly coupled shift registers. If $z$ shift registers are fed back by a suitable combination of their output values, a periodic binary sequence of "0" and "1" is obtained which is $2^z-1$ long. Such binary sequences are also referred to as maximum length sequences, if the characteristic polynomial, which describes the feed back of the shift register, is irreducible. An irreducible polynomial may not be divided into other polynomials. With non-dividable polynomials, maximum length sequences may be generated, but not all of those irreducible polynomials generate a maximum length sequence. Only certain ones may be used for this purpose. These polynomials are called primitive.

Not only auto-correlation characteristics of a PN sequence may be relevant for the spread spectrum technology. In connection with (spread) code multiplex, in particular also cross-correlation characteristics of different PN sequences are of high interest. The lower the cross-correlation values of different PN sequences, the more transmit electrodes 102-$n$ (n=1, ..., N) may take part in the code multiplex or the lower the mutual interferences will be, respectively.

Special PN sequences with especially good cross-correlation characteristics include, for example, the so-called gold sequences which consist of two maximum length sequences linked combinatorially. A further possibility to obtain orthogonal spread sequences 207-$n$ (n=1, ..., N) are so-called Walsh functions.

The orthogonal spread sequences 207-$n$ (n=1, ..., N) are modulated to the carrier signal 209 generated by the controllable oscillator 210 and simultaneously sent into the object 220 to be measured via the N transmit electrodes 102-$n$ (n=1, ..., N).

In the embodiments illustrated in FIG. 4, the means 106 for receiving includes M receive branches, each with a receive electrode 112-$m$ (m=1, ..., M), a receiver 304-$m$ (m=1, ..., M) and a demodulator 214-$m$ (m=1, ..., M). In the correlation receiver 216 the respective demodulated M signals are cross-correlated with one different spread sequence 207-$n$ (n=1, ..., N) each to obtain M·N correlation values. The magnitude of the correlation value $\rho_{m,n}$ is a measure for the energy of the $m^{th}$ receive signal derived from the $n^{th}$ transmitted signal.

The measurement rate of the embodiment illustrated in FIG. 4 may be increased compared to the multiplexed concept of the embodiments described with reference to FIGS. 2 and 3, and measurement values which are completely simultaneous may be guaranteed for all electrodes. This is enabled by the use of DSSS. A spread code 207-$n$ ($n=1, \ldots, N$) is associated to each transmit electrode 102-$n$ ($n=1, \ldots, N$). The spread codes 207-$n$ ($n=1, \ldots, N$) are all orthogonal to each other, i.e., they comprise virtually no cross-correlation to each other. One advantage of the arrangement 400 is that the effectiveness of the frequency hopping may be increased by the FHSS control 222, as a frequency change may occur after each measurement, i.e., after each complete run of the spread codes 207-$n$.

Figure 5:
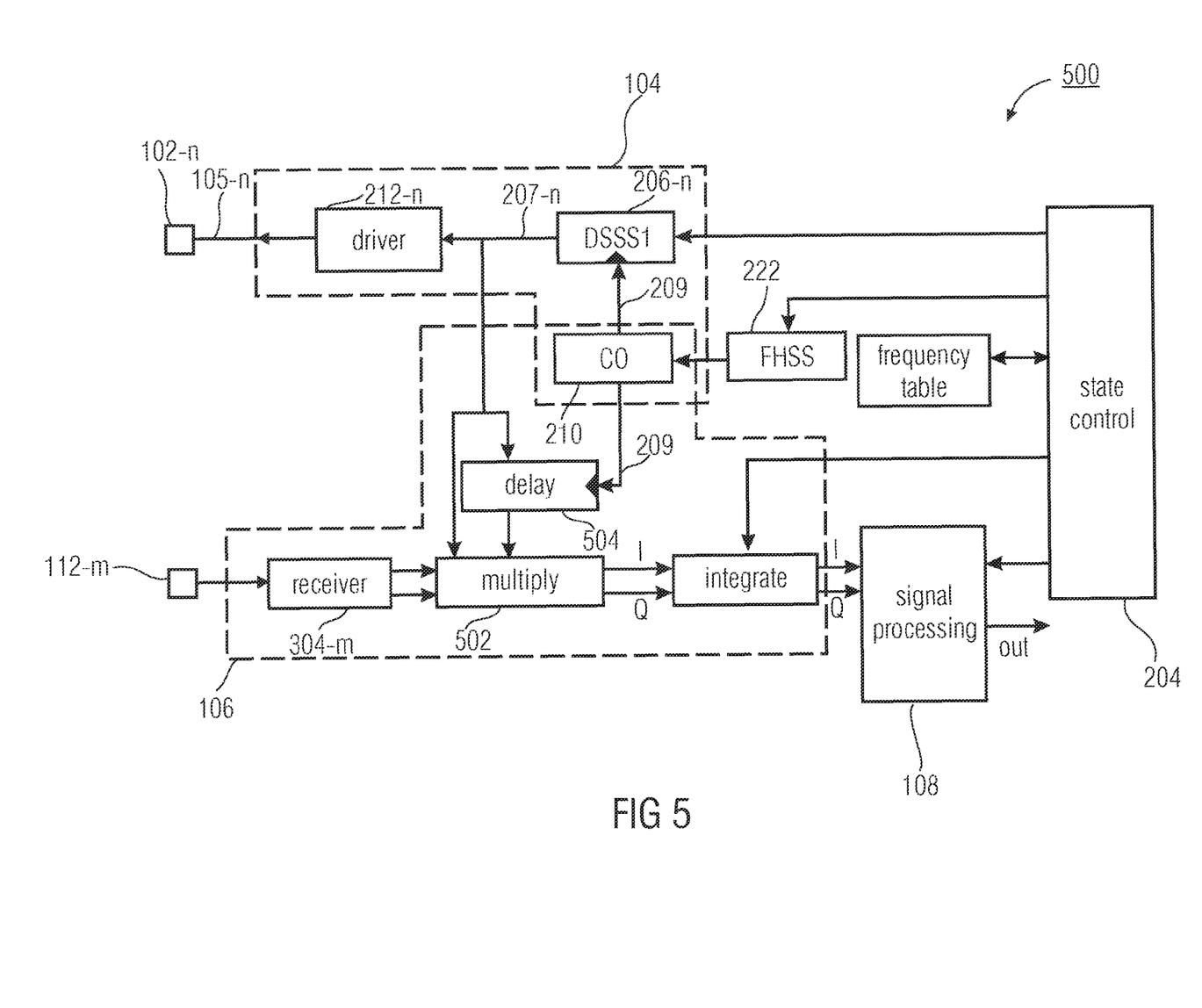
FIG. 5 shows a block diagram of a capacitive sensor according to a further embodiment of the present invention.

The demodulation of a signal 117-$m$ ($m=1, \ldots, M$) received from a receive electrode 102-$m$ ($m=1, \ldots, M$) with a demodulator 214-$m$ ($m=1, \ldots, M$) and a downstream correlation receiver 216-$m$ ($m=1, \ldots, M$) may be simplified substantially in the case of a synchronous reception. One embodiment for a synchronous reception is illustrated in FIG. 5 for one single channel, i.e., for a channel from a transmit electrode to a receive electrode. Of course, embodiments are not limited to a transmit electrode or a receive electrode, respectively.

The frequency spread signal or transmit signal 105, respectively, is generated by generating a spread sequence 207 with a clock generated by the FHSS control 222 and the controllable oscillator 210. That means, that in this case the carrier signal 209 serves as a clock signal for the spread code generator 206. For example, each rising signal edge of the carrier signal 209 designates a clock cycle. The driver 212 for the transmit electrode 102 is in this case reduced to a digital driver, with a limited edge steepness. With a logical "1" of the spread code 207, for example, a high voltage $V_{high}$ is applied to the transmit electrode 102, and with a logical "0" of the spread code 207 a low voltage $V_{low}$ is applied to the transmit electrode 102.

The demodulation may also be substantially simplified by using the control signal for the transmit electrode driver 212, i.e., the spread code 207 for the demodulation of the received signal 117. In this case, the correlated portion in the received signal 117 may be determined by an integration over the duration of the spread code 207. The multiplication in the demodulation in block 502 may here also simply be realized by inverting the receive signal 117 according to the logically high or logically low state of the control signal 207. The inversion is especially simple to realize when the receive signal 117 provided by the receiver 304 is provided differentially. In this case, crossing switches may be used which exchange the two signal lines in the inverted state. An I/Q demodulation for phase determination may be approximated by additionally demodulating with a control signal 207 delayed by a quarter clock period. This delay takes place in block 504.

A run-time determination based on such demodulated I/Q signals is only expressive, however, if the group run-time, i.e., the time delay, of the signal components of the frequency spread signal 105 when passing the measurement object 220, may be regarded to be approximately constant across the frequency range of the frequency spread signal 105.

A band spreading in a capacitive sensor may also be realized by means of a so-called switched capacitor circuit (SC circuit). SC circuits are networks set up from periodically actuated switches, capacities and operation amplifiers. In this respect, in FIG. 6, a further embodiment of the present invention is illustrated.

Figure 6:
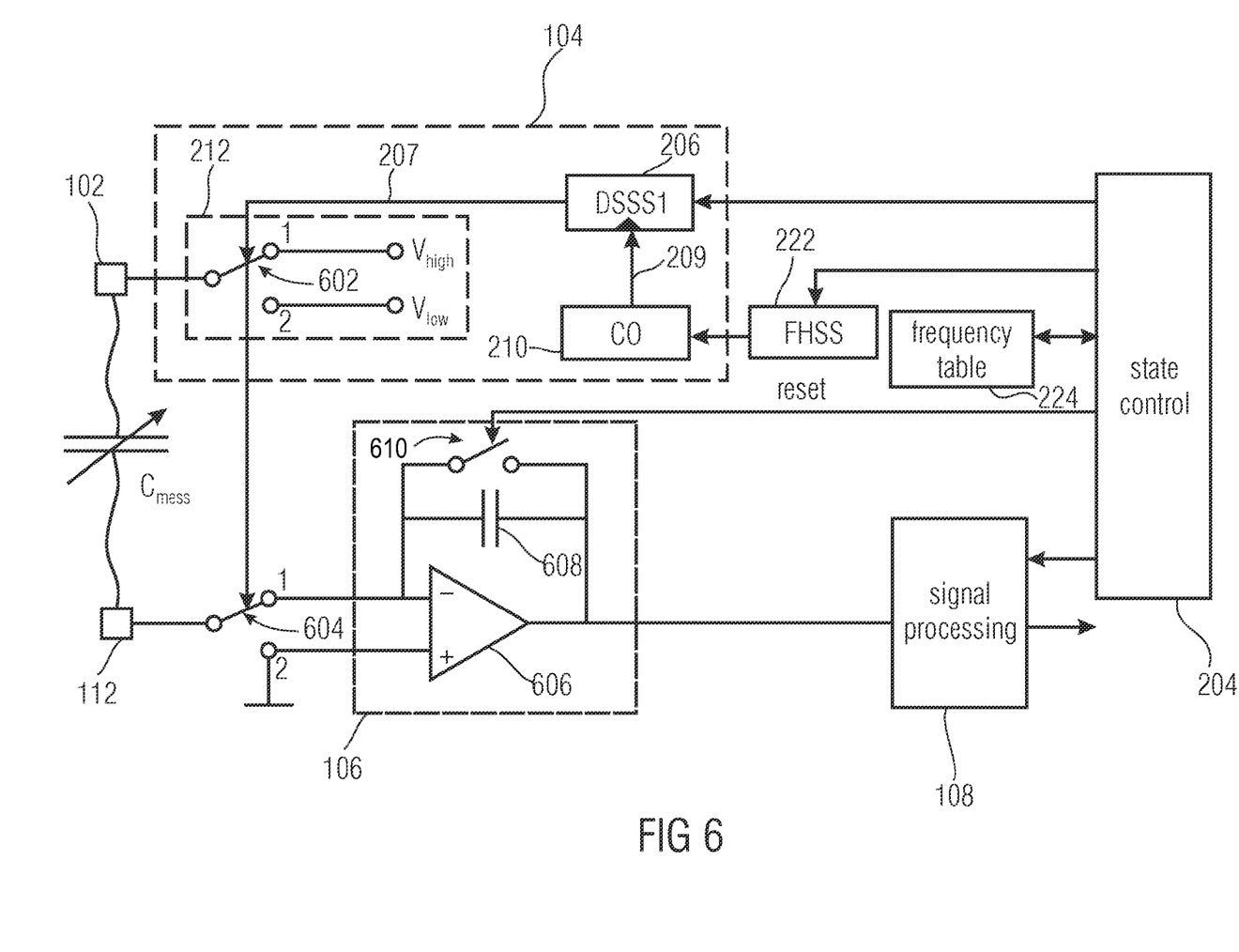
FIG. 6 shows a block diagram of a further capacitive sensor according to an embodiment of the present invention.

Only exemplarily, FIG. 6 shows a transmit branch with a transmit electrode 102 and a receive branch with a receive electrode 112. Of course, embodiments are not limited to a transmit electrode or a receive electrode.

A capacitance $C_{mess}$ to be detected forms between the transmit and receive electrodes 102, 112. In the embodiments illustrated in FIG. 6, the carrier signal 209 of the controllable oscillator 210 is used as a clock signal for the spread code generator 206. The spread code 207 applied at the output of the spread code generator 206 controls a first switch 602. In a first switch position of the first switch 602 a high potential $V_{high}$ is applied to the transmit electrode 102, while in a second switch position a low potential $V_{low}$ is applied to the transmit electrode 102. In addition to the first switch 602 on the transmit side, the spread code 207 controls a second switch 604 on the receive side, in the same way as the first switch 602. In the switch position of the second switch 604 illustrated in FIG. 6, the receive electrode 112 is connected to a first (inverting) input of an operation amplifier 606. In the second switch position of the second switch 604, the receive electrode 112 is connected to the inverting input of the operation amplifier 606 which is set to a mass potential. The output of the operation amplifier 606 is coupled back to the inverting input of the operation amplifier via a capacitance 608. Parallel to the capacitance 608, a third switch 610 is connected, controlled by the sequence control circuit 204. Further, the output of the operation amplifier 606 is coupled to an input of the means 108 for determining the capacitance value $C_{mess}$.

The measurement capacitance $C_{mess}$ between the two electrodes 102, 112, which depends on a coupling by objects which are located in the area in between, is charged to a voltage $V_{low}$ in a first phase (switch 602, 604, each in switch position 2) as compared to the mass potential applied to the other electrode 112. In a second phase (switch 602, 604, each in switch position 1) the measurement capacitance $C_{mess}$ is re-charged to $V_{high}$. The receive electrode 112 is here held on a virtual mass potential by the operation amplifier 606. The necessitated charge difference is shifted to the capacitor 608 located in the feed back or back coupling branch, respectively, of the operation amplifier 606. After one or several repeated spread sequences 207, a charge integration is ended and the integrated value, i.e., the charge on the integration capacitor 608 is passed on to the evaluation circuit 108 before closing the third switch 610. By closing the third switch 610, the integration capacitor 608 is discharged or reset, respectively. By generating the clock with the SC circuit, an irregular length of clock periods and a spreading of the spectrum of the voltage between the electrodes 102, 112 is achieved.

In the SC circuit illustrated in FIG. 6, a charge incoming on the measurement capacitance $C_{mess}$ is only integrated in half of the clocks. This leads to a sampling and thus to an increase of the noise.

Capacitive sensors use alternating signals for determining the capacitive couplings influenced by measurement variables to be determined. Basically, electromagnetic waves are coupled to these alternating signals and a radiation results. Due to legal regulations, the radiated spectral power may not exceed certain limits.

Embodiments of the present invention transfer advantages of the spread band technology known, for example, from mobile communication applications to sensors, in particular capacitive sensors. Advantages of spread band technology consist, for example, in reducing the spectral power density and in increasing the signal-to-noise ratio which increases with the length of a spread code. As, in capacitive measurement technology, no information is encoded, by lengthening the spread code a transmittable data rate need not be decreased. In connection with a capacitive measurement, spread spectrum technology thus theoretically enables any spreading of the spectrum by lengthening the spread sequence with reference to a predefined period of time. In practice, it is to be noted, however, that a multiplexer may be advantageous between several electrodes, and thus the length of a spread code and thus of a measurement should be limited.

For the case of a very wide band measurement channel or a very wide band measurement object, respectively, embodiments of the present invention allow an additional frequency hopping. That is, after a measurement with a certain carrier frequency and a spread code, the carrier frequency and possibly also the spread code may be changed to be able to measure a different portion of the frequency spectrum. Further, by the combination of band spread signals and frequency hopping methods according to embodiments of the present invention, an electromagnetic emission of a capacitive sensor system may be reduced. In other words, by embodiments of the present invention, the electromagnetic compatibility of capacitive sensors may be increased.

A further reason for the additional frequency hopping is the following: it may be possible that a capacitive sensor is interfered with by another device which uses a similar carrier frequency $f_c$. Thus, in embodiments of the present invention, apart from the amplitude modulation by the binary random signal 207, a frequency hopping method with regard to the carrier frequency $f_c$ is provided. Here, from a plurality of frequencies from a certain frequency range a random or predefined selection is performed. Advantageously, the carrier frequency $f_c$ is maintained constant for all partial measurements within a measurement cycle, as thereby a good "matching", i.e., an equal ratio between the output value and the partial capacitance, of the individual measurement values is given. The carrier frequency $f_c$ is then changed after a measurement cycle is terminated.

According to embodiments of the present invention, capacitive sensors may, for example, be used for different detection applications in the automobile industry. One of a great number of application possibilities is, for example, the detection of seat occupation for intelligent airbag systems. With capacitance sensors according to embodiments, information about the position of a person on a seat and/or changes of the position, for example, during an accident, may be detected. A challenge in the design of intelligent airbag systems is a reliable and robust detection and classification of seat movements. Here, for example, the size, the weight and the position of a person on a seat are of special interest, as potential threats to the person in the case of triggering an airbag may be detected by this. Based on a detected occupation scenario, selected airbags may be switched off individually or be triggered with reduced performance.

Subsequently it is to be noted, that the above embodiments are not limited to the respective components of the capacitive sensors or the discussed functioning, as these components and methods may vary. Terms used here are only determined to describe special embodiments and are not used in a limiting sense. If the singular form or the indefinite article are used in the description and in the claims, these also refer to the plural form of those elements, as far as the context does not indicate otherwise. The same applies vice versa.

Depending on the circumstances, the above-described methods may be implemented in hardware or in software. The implementation may be on a digital storage medium, in particular a floppy disc or a CD having electronically readable control signals which may cooperate with a programmable computer system and/or microcontroller such that the corresponding method is performed. In general, the above embodiments may thus also be implemented in a computer program product having a program code stored on a machine-readable carrier for performing the respective method, when the computer program product runs on a computer and/or a microcontroller. In other words, the above embodiments may thus also be implemented as a computer program having a program code for performing the method for detecting a capacitance, when the computer program runs on a computer and/or a microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A capacitance sensor, comprising:
a first electrode and a second electrode;
a frequency spread signal generation circuit coupled to the first electrode and the second electrode to apply a first frequency spread signal based on a first spread sequence and a periodic signal with a frequency to the first electrode, and concurrently a second frequency spread signal based on a second spread sequence being orthogonal to the first spread sequence and the periodic signal to the second electrode;
a frequency controller coupled to the frequency spread signal generation circuit to vary the frequency of the periodic signal;
a receiver circuit coupled to the first electrode and the second electrode or a further electrode to receive a version of the first frequency spread signal which depends on a capacitance applied to the first electrode and a version of the second frequency spread signal that depends on a capacitance applied to the second electrode; and
an evaluation circuit coupled to the receiver circuit to determine a capacitance value based on the received dependent versions of the first and second frequency spread signal.

2. A capacitance sensor comprising:
a plurality of transmit electrodes;
a multiplexer for selecting one or several of the plurality of transmit electrodes;
a frequency spread signal generation circuit connected to the transmit electrodes via the multiplexer, to apply a frequency spread signal based on a spread sequence and a periodic signal with a frequency to the one or several transmit electrodes, wherein the multiplexer is connected between the transmit electrodes and the frequency spread signal generation circuit;
a frequency controller coupled to the frequency spread signal generation circuit to vary the frequency of the periodic signal;
a receiver circuit coupled to the one or several transmit electrodes or a receive electrode to receive a version of the frequency spread signal which depends on a capacitance applied to the one or several transmit electrodes; and
an evaluation circuit coupled to the receiver circuit to determine a capacitance value based on the received dependent version of the frequency spread signal.

3. The capacitance sensor according to claim 2, wherein the frequency spread signal generation circuit comprises a spread code generator.

4. The capacitance sensor according to claim 3, wherein the spread code generator is implemented to generate a periodic spread code with a period duration.

5. The capacitance sensor according to claim 4, wherein the frequency controller is implemented to change the frequency after each integer multiple of the period duration of the periodic spread code.

6. The capacitance sensor according to claim 2, wherein the frequency spread signal generation circuit comprises a controllable oscillator coupled to the frequency controller to adjust the frequency of the periodic signal of the controllable oscillator.

7. The capacitance sensor according to claim 2, wherein the spread sequence comprises symbols and the symbols of the spread sequence comprise a symbol duration, and wherein the frequency controller is implemented to change the frequency after an integer multiple of the symbol duration.

8. The capacitance sensor according to claim 2, wherein the frequency spread signal generation circuit comprises a modulator and a controllable oscillator coupled to a modulator to modulate the periodic signal of the controllable oscillator with a spread code.

9. The capacitance sensor according to claim 8, wherein the modulator is implemented to modulate a phase of the periodic signal depending on the spread code.

10. The capacitance sensor according to claim 8, wherein the receiver circuit comprises a demodulator to combine a signal received from the transmit electrodes or the further electrode with the periodic signal of the controllable oscillator to acquire a demodulated signal.

11. The capacitance sensor according to claim 2, wherein a functioning of the frequency spread signal generation circuit depends on a spread code and the receiver circuit comprises a correlator to subject a signal coming from the at least one or the further electrode to a correlation with the spread code.

12. The capacitance sensor according to claim 2, wherein the plurality of transmit electrodes is controlled in a time multiplex method so that all transmit electrodes with a first carrier frequency are controlled within a first measurement interval and all transmit electrodes with a second carrier frequency which is different from the first carrier frequency are controlled within a second measurement interval.

13. The capacitance sensor according to claim 2, wherein the receiver circuit comprises a switched capacitor circuit.

14. A capacitance sensor comprising:
at least one electrode;
a frequency spread signal generation circuit coupled to the at least one electrode to apply a frequency spread signal based on a spread sequence and a periodic signal with a frequency to the at least one electrode;
a frequency controller coupled to the frequency spread signal generation circuit to vary the frequency of the periodic signal;
a receiver circuit coupled to the at least one or a further electrode to receive a version of the frequency spread signal which depends on a capacitance applied to the at least one electrode; and
an evaluation circuit coupled to the receiver circuit to determine a capacitance value based on the received dependent version of the frequency spread signal,
wherein the frequency spread signal generation circuit comprises a spread code generator, wherein the spread code generator is implemented to generate a periodic spread code with a period duration, wherein the capacitance sensor further comprises a plurality of transmit electrodes and wherein the integer multiple of the period duration of the periodic spread code is determined by a number of the transmit electrodes.

15. A capacitance sensor comprising:
a plurality of transmit electrodes;
a frequency spread signal generation circuit coupled to the plurality of transmit electrodes to apply a frequency spread signal based on a spread sequence and a periodic signal with a frequency to the transmit electrodes;
a frequency controller coupled to the frequency spread signal generation circuit to vary the frequency of the periodic signal;
a receiver circuit coupled to the at least one of the transmit electrodes or a further electrode to receive a version of the frequency spread signal which depends on a capacitance applied to the transmit electrodes; and
an evaluation circuit coupled to the receiver circuit to determine a capacitance value based on the received dependent version of the frequency spread signal,
wherein the spread sequence comprises symbols and the symbols of the spread sequence comprise a symbol duration, wherein the frequency controller is implemented to change the frequency after an integer multiple of the symbol duration, and wherein the integer multiple of the symbol duration is determined by a number of the transmit electrodes.

16. The capacitance sensor according to claim 15, wherein each transmit electrode of the plurality of transmit electrodes is controlled with a phase-shifted version of the spread sequence.

17. A capacitance sensor comprising:
a plurality of receive electrodes;
a multiplexer for selecting one or several of the plurality of receive electrodes, the multiplexer being connected between the plurality of receive electrodes and a receiver circuit;
a frequency spread signal generation circuit coupled to at least one transmit electrode to apply a frequency spread signal based on a spread sequence and a periodic signal with a frequency to the at least one transmit electrode;
a frequency controller coupled to the frequency spread signal generation circuit to vary the frequency of the periodic signal;
the receiver circuit connected to the plurality of the receive electrodes via the multiplexer, to receive a version of the frequency spread signal which depends on a capacitance applied between the at least one transmit electrode and the one or several receive electrodes; and
an evaluation circuit coupled to the receiver circuit to determine a capacitance value based on the received dependent version of the frequency spread signal.

18. A capacitance sensor comprising:
at least one electrode
a frequency spread signal generation circuit coupled to the at least one electrode to apply a frequency spread signal based on a spread sequence and a periodic signal with a frequency to the at least one electrode;
a frequency controller coupled to the frequency spread signal generation circuit to vary the frequency of the periodic signal;
a receiver circuit coupled to the at least one or a further electrode to receive a version of the frequency spread signal which depends on a capacitance applied to the at least one electrode; and
an evaluation circuit coupled to the receiver circuit to determine a capacitance value based on the received dependent version of the frequency spread signal,
wherein the spread sequence comprises spread sequence symbols with a spread sequence symbol duration and wherein the evaluation circuit is implemented to determine at least one capacitance value or a value derived from the same based on the received version of the frequency spread signal during the spread sequence symbol duration.

19. A capacitance sensor, comprising:
a plurality of electrodes;
a frequency spread signal generation circuit which is coupled to the plurality of electrodes and which is implemented to control the plurality of electrodes in time division multiplex so that, for a controlled electrode, a frequency spread signal based on a spread symbol sequence with a spread symbol rate and a periodic signal is applied for a spread symbol duration;
a receiver circuit coupled to the plurality of electrodes or a further electrode to receive a version of the frequency spread signal which depends on a capacitance applied to the plurality of electrodes; and
an evaluation circuit coupled to the receiver circuit to determine a capacitance value based on sampling values of the received dependent version of the frequency spread signal which are determined by a sampling rate which is equal to or higher than the spread symbol rate.

20. The capacitance sensor according to claim 19, further comprising a frequency controller which is coupled to the frequency spread signal generation circuit to vary a frequency of the periodic signal after an integer multiple of the spread symbol duration.

21. A capacitance sensor, comprising:
a first and a second electrode;
means for applying a first frequency spread signal based on a first spread sequence and a periodic signal with a frequency to the first electrode and concurrently a second frequency spread signal based on a second spread sequence and the periodic signal to the second electrode;
means for varying the frequency of the periodic signal;
means for receiving a version of the first frequency spread signal and the second frequency spread signal which depends on a capacitance applied to the first electrode and the second electrode, respectively; and
means for determining a capacitance value or a signal that may be derived from the capacitance value based on the received dependent versions of the first and second frequency spread signal.

22. A method for detecting a capacitance or a capacitance change, comprising:
applying a frequency spread signal to at least one electrode, wherein the frequency spread signal is based on a spread sequence and a periodic signal with a frequency;
varying the frequency of the periodic signal;
receiving a version of the frequency spread signal which depends on a capacitance applied to the at least one electrode; and
determining the capacitance or a value which may be derived from the capacitance from the received dependent version of the frequency spread signal, wherein the spread sequence comprises spread sequence symbols with a spread sequence symbol duration and wherein the determine comprises determining at least one capacitance value or a value derived from the same based on the received version of the frequency spread signal during the spread sequence symbol duration.

23. A computer program for performing a method for detecting a capacitance or a capacitance change, comprising:
applying a frequency spread signal to at least one electrode, wherein the frequency spread signal is based on a spread sequence and a periodic signal with a frequency;
varying the frequency of the periodic signal;
receiving a version of the frequency spread signal which depends on a capacitance applied to the at least one electrode; and
determining the capacitance or a value which may be derived from the capacitance from the received dependent version of the frequency spread signal,
when the computer program is executed on a computer and/or microcontroller, wherein the spread sequence comprises spread sequence symbols with a spread sequence symbol duration and wherein the determine comprises determining at least one capacitance value or a value derived from the same based on the received version of the frequency spread signal during the spread sequence symbol duration.

* * * * *